United States Patent
Oda et al.

(10) Patent No.: US 11,732,319 B2
(45) Date of Patent: Aug. 22, 2023

(54) NON-ORIENTED ELECTRICAL STEEL SHEET

(71) Applicant: JFE Steel Corporation, Tokyo (JP)

(72) Inventors: Yoshihiko Oda, Tokyo (JP); Yoshiaki Zaizen, Tokyo (JP); Tomoyuki Okubo, Tokyo (JP); Takaaki Tanaka, Tokyo (JP); Yukino Miyamoto, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 296 days.

(21) Appl. No.: 17/414,042

(22) PCT Filed: Dec. 10, 2019

(86) PCT No.: PCT/JP2019/048175
§ 371 (c)(1),
(2) Date: Jun. 15, 2021

(87) PCT Pub. No.: WO2020/137500
PCT Pub. Date: Jul. 2, 2020

(65) Prior Publication Data
US 2022/0049323 A1    Feb. 17, 2022

(30) Foreign Application Priority Data

Dec. 27, 2018 (JP) ................................ 2018-245590
Sep. 5, 2019 (WO) .................. PCT/JP2019/034896

(51) Int. Cl.
*C21D 9/46* (2006.01)
*C21D 6/00* (2006.01)
(Continued)

(52) U.S. Cl.
CPC ............... *C21D 9/46* (2013.01); *C21D 6/004* (2013.01); *C21D 6/005* (2013.01); *C21D 6/008* (2013.01);
(Continued)

(58) Field of Classification Search
CPC ....................................................... C21D 9/46
See application file for complete search history.

(56) References Cited

U.S. PATENT DOCUMENTS 8,157,928 B2   4/2012  Tanaka et al.
10,526,673 B2  1/2020  Okubo et al.
(Continued)

FOREIGN PATENT DOCUMENTS

CN    101490294 A    7/2009
CN    101906581 A    12/2010
(Continued)

OTHER PUBLICATIONS

English Machine Translation of KR 10-0479992 B1 of BAE. (Year: 2005).*

(Continued)

*Primary Examiner* — Jophy S. Koshy
(74) *Attorney, Agent, or Firm* — RatnerPrestia (57) ABSTRACT

Proposed is a non-oriented electrical steel sheet being low in iron loss and excellent in tensile strength and fatigue strength, which has a chemical composition comprising C: not more than 0.005 mass %, Si: 3 to 5 mass %, Mn: not more than 5 mass %, P: not more than 0.1 mass %, S: not more than 0.01 mass %, Al: not more than 3 mass %, N: not more than 0.005 mass %, Zn: 0.0005 mass % to 0.003 mass %, and the remainder being Fe and inevitable impurities, an average crystal grain size being not more than 40 μm, the number of the inclusions having a diameter of not less than 5 μm being not more than 5/mm$^2$, a tensile strength being not less than 600 MPa, and the fatigue strength being not less than 450 MPa.

16 Claims, 2 Drawing Sheets

(51) Int. Cl.
*C21D 8/00* (2006.01)
*C21D 8/12* (2006.01)
*C22C 38/00* (2006.01)
*C22C 38/04* (2006.01)
*C22C 38/06* (2006.01)
*C22C 38/20* (2006.01)
*C22C 38/22* (2006.01)
*C22C 38/24* (2006.01)
*C22C 38/28* (2006.01)
*C22C 38/34* (2006.01)
*C22C 38/40* (2006.01)
*H01F 1/147* (2006.01)

(52) U.S. Cl.
CPC .......... *C21D 8/005* (2013.01); *C21D 8/1222* (2013.01); *C21D 8/1233* (2013.01); *C22C 38/001* (2013.01); *C22C 38/002* (2013.01); *C22C 38/005* (2013.01); *C22C 38/008* (2013.01); *C22C 38/04* (2013.01); *C22C 38/06* (2013.01); *C22C 38/20* (2013.01); *C22C 38/22* (2013.01); *C22C 38/24* (2013.01); *C22C 38/28* (2013.01); *C22C 38/34* (2013.01); *C22C 38/40* (2013.01); *H01F 1/147* (2013.01); *C22C 2202/02* (2013.01)

(56) References Cited

U.S. PATENT DOCUMENTS

| | | | |
|---|---|---|---|
| 11,162,155 | B2 | 11/2021 | Park et al. |
| 2009/0202383 | A1* | 8/2009 | Tanaka ................ C22C 38/004 148/624 |
| 2009/0301609 | A1 | 12/2009 | Arita et al. |
| 2015/0027590 | A1 | 1/2015 | Nakanishi et al. |
| 2015/0187475 | A1 | 7/2015 | Zaizen et al. |
| 2015/0318093 | A1 | 11/2015 | Hill et al. |
| 2017/0260600 | A1 | 9/2017 | Okubo et al. |
| 2019/0017136 | A1 | 1/2019 | Lee |
| 2019/0345576 | A1 | 11/2019 | Park et al. |
| 2020/0095659 | A1 | 3/2020 | Kim et al. |
| 2020/0152363 | A1 | 5/2020 | Kubota et al. |
| 2020/0232059 | A1 | 6/2020 | Fujimura et al. |

FOREIGN PATENT DOCUMENTS

| | | | | |
|---|---|---|---|---|
| CN | 105908072 | A | 8/2016 | |
| CN | 106574334 | A | 4/2017 | |
| JP | 10140243 | A | 5/1998 | |
| JP | 2005113252 | A | 4/2005 | |
| JP | 2007162097 | A | 6/2007 | |
| JP | 2010031328 | A | 2/2010 | |
| JP | 2010159494 | A | 7/2010 | |
| JP | 2011046997 | A | 3/2011 | |
| JP | 2011084761 | A | 4/2011 | |
| JP | 2011089204 | A | 5/2011 | |
| JP | 2012136763 | A | 7/2012 | |
| JP | 2012140676 | A | 7/2012 | |
| JP | 5533958 | B2 | 5/2014 | |
| JP | 2016156044 | A | 9/2016 | |
| JP | 2018111847 | A | 7/2018 | |
| KR | 10-0479992 | B1 * | 3/2005 | .......... C21D 8/1222 |
| KR | 20180071587 | A | 6/2018 | |
| WO | 2016017263 | A1 | 2/2016 | |
| WO | 2017111554 | A1 | 6/2017 | |
| WO | 2018117597 | A1 | 6/2018 | |
| WO | 2018117640 | A1 | 6/2018 | |
| WO | 2018164185 | A1 | 9/2018 | |
| WO | 2018220837 | A1 | 12/2018 | |

OTHER PUBLICATIONS

International Search Report and Written Opinion for International Application No. PCT/JP2019/048175, dated Mar. 3, 2020, 6 pages.
Taiwanese Office Action for Taiwanese Application No. 108147795, dated Jul. 10, 2020, with Partial English Translation, 4 pages.
Chinese Office Action with Search Report for Chinese Application No. 201980079695.8, dated Mar. 1, 2022, 12 pages.
Korean Request for Submission of Opinion for Korean Application No. 10-2021-7016032, dated Nov. 1, 2022 with translation, 6 pages.
Extended European Search Report for European Application No. 19901942.3, dated Mar. 18, 2022, 14 pages.

* cited by examiner

NON-ORIENTED ELECTRICAL STEEL SHEET

CROSS REFERENCE TO RELATED APPLICATIONS

This is the U.S. National Phase application of PCT/JP2019/048175, filed Dec. 10, 2019, which claims priority to Japanese Patent Application No. 2018-245590, filed Dec. 27, 2018 and PCT Patent Application No. PCT/JP2019/034896, filed Sep. 5, 2019, the disclosures of these applications being incorporated herein by reference in their entireties for all purposes.

FIELD OF THE INVENTION

This invention relates to a non-oriented electrical steel sheet, and more concretely to a non-oriented electrical steel sheet preferably used for a rotor core in a motor.

BACKGROUND OF THE INVENTION

A motor for electric vehicles and air conditioners, which is required to have high efficiency, usually uses an interior permanent magnet type motor (IPM motor). A rotor core of the IPM motor has a permanent magnet embedded into a slot part, and when rotating at high speed, a centrifugal force exerts a large amount of stress on a bridge section. From the viewpoint of securing the rotor strength, the width of the bridge should be made wider, but in this case, the leakage flux of the permanent magnet increases to thereby decrease the motor efficiency. Thus, the bridge width is designed to be as narrow as possible within the range where rotor strength can be achieved. Therefore, the non-oriented electrical steel sheet used for the motor core needs to have tensile strength that can withstand the centrifugal force at a high-speed rotation and fatigue strength that copes with repeated loading. Moreover, iron loss resulted from higher harmonic waves is caused on the surface of the rotor core in a concentrated winding motor, so that the electrical steel sheet used for the rotor core needs to be low in high frequency iron loss.

As a raw material for a rotor core that meets these requirements, for example, Patent Literature 1 discloses a high-strength electrical steel sheet having a chemical composition of Si: 0.2 to 3.5 mass %, Al: not more than 2.50 mass %, and Nb: 0.05 to 8.0 mass %. Also, Patent Literature 2 discloses a high-strength electrical steel sheet having a chemical composition of Si: 2.0 to 3.5 mass %, Al: 0.02 to 3.0 mass %, and N: 0.005 to 0.020 mass %, and an average crystal grain size of not more than 10 μm from the surface of the product plate to a depth of 10 μm.

PATENT LITERATURE

Patent Literature 1: JP-A-2010-159494
Patent Literature 2: JP-A-2005-113252

SUMMARY OF THE INVENTION

However, the method disclosed in Patent Literature 1 uses precipitation strengthening of Nb, which may cause a problem that strength is high but iron loss is increased. The method disclosed in Patent Literature 2 also has a problem that iron loss is increased due to high nitrogen content. Moreover, it is effective to reduce impurity elements such as C, S, and N while making these elements finer, as means for improving the tensile strength and fatigue strength of an electrical steel sheet, but there is a problem that the strength largely varies.

Aspects of the invention are made in consideration of the above problems inherent to the conventional methods, and the object thereof is to provide a non-oriented electrical steel sheet being low in iron loss and excellent in tensile strength and fatigue strength.

The inventors have made various studies to solve the above problems. Consequently, they have found out that it is possible to increase tensile strength and fatigue strength while attaining low iron loss by reducing inclusions and also Zn content, which is contained as an impurity, in steel, and moreover, to reduce the variation of the strength, and aspects of the invention have been accomplished.

That is, aspects of the present invention include a non-oriented electrical steel sheet that has a chemical composition comprising C: not more than 0.005 mass %, Si: 3 to 5 mass %, Mn: not more than 5 mass %, P: not more than 0.1 mass %, S: not more than 0.01 mass %, Al: not more than 3 mass %, N: not more than 0.005 mass %, Zn: 0.0005 to 0.003 mass %, and the remainder being Fe and inevitable impurities, an average crystal grain size being not more than 40 μm, the number of inclusions having a diameter of not less than 5 μm being not more than $5/mm^2$, a tensile strength being not less than 600 MPa, and a fatigue strength being not less than 450 MPa.

The non-oriented electrical steel sheet according to aspects of the invention further contains Cr by 0.1 to 5 mass % in addition to the above chemical composition.

The non-oriented electrical steel sheet according to aspects of the invention further contains Ca by 0.001 to 0.005 mass % in addition to the above chemical composition.

The non-oriented electrical steel sheet according to aspects of the invention further contains one or two selected from Sn: 0.001 to 0.1 mass % and Sb: 0.001 to 0.1 mass % in addition to the above chemical composition.

The non-oriented electrical steel sheet according to aspects of the invention further contains at least one selected from Ni: 0.1 to 2 mass %, Mo: 0.001 to 0.05 mass %, Cu: 0.01 to 0.2 mass %, Mg: 0.001 to 0.005 mass %, REM: 0.001 to 0.005 mass %, and (Ti+V): 0.005 to 0.05 mass %.

Aspects of the present invention can provide a non-oriented electrical steel sheet having a low iron loss and being excellent in tensile strength and fatigue strength. Further, aspects of the invention can stably provide a rotor core material for a high-speed rotating being excellent in an iron loss property at a high frequency by using the non-oriented electrical steel sheet.

DETAILED DESCRIPTION OF EMBODIMENTS OF THE INVENTION

An experiment that has led to the development of aspects of the invention will be explained.

<Experiment 1>

First, in order to study the influence of a crystal grain size upon fatigue strength, a steel containing C: 0.0018 mass %, Si: 3.4 mass %, Mn: 0.6 mass %, P: 0.01 mass %, S: 0.002 mass %, Al: 0.9 mass %, N: 0.0013 mass %, Zn: 0.0012 mass % and O: 0.0020 mass % is melted in a laboratory, casted into a steel ingot and hot rolled to form a hot-rolled sheet with a thickness of 2 mm. Next, the hot-rolled sheet is subjected to a hot-band annealing at 1000° C. for 30 seconds under an atmosphere of 100 vol % $N_2$, pickling, and cold rolling to form a cold-rolled sheet with a thickness of 0.25 mm. The cold-rolled is then subjected to a finish annealing under an atmosphere of 20 vol % $H_2$-80 vol % $N_2$ for a soaking time of 10 seconds by varying the soaking temperature within the range of 650 to 1000° C.

Next, a specimen for fatigue strength test having a parallel body with a width of 5 mm and a length of 150 mm is taken out from the finish-annealed steel sheet from the longitudinal direction as the rolling direction, and subjected to a fatigue test. In this test, the parallel body is finished so that the surface roughness is ∇∇∇:3.2S (JIS B0601(1970), and the same applies hereinafter), and polished with an emery paper No. 800 along with the longitudinal direction. The fatigue test is performed under conditions of pulsating tension loading, a stress ratio of 0.1, and a frequency of 20 Hz, and the stress amplitude at which no breakage is caused after repetitions of $10^7$ times is determined as a fatigue limit. Moreover, the average crystal grain size of the test specimens is measured in accordance with JIS G0551 after polishing a cross section in the rolling direction and etching it with Nital.

Figure 1:
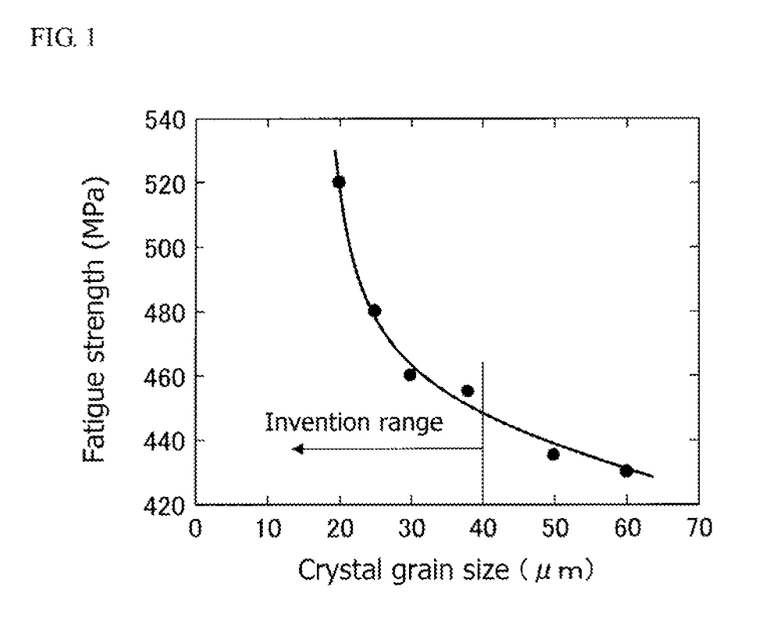
FIG. 1 is a graph showing a relation between an average crystal grains and a fatigue strength.

FIG. 1 shows the relation between an average crystal grain size and a fatigue limit. As seen from FIG. 1, the fatigue limit is improved by making the average crystal grain size finer, and concretely, the fatigue limit is increased to not less than 450 MPa by decreasing the average crystal grain size to not more than 40 μm. At the same time, a tensile strength of not less than 600 MPa can be obtained by decreasing the average crystal grain size to not more than 40 μm. From the above result, the average crystal grain size of a product sheet according to aspects of the invention is defined to be not more than 40 μm, preferably not more than 30 μm. Here, the fatigue limit of 450 MPa is the lower limit where a bridge portion of a rotor needed for a rotor material of a HEV/EV motor is not broken by repetitive use. The preferable fatigue limit is not less than 470 MPa, and the preferable tensile strength is not less than 650 MPa.

<Experiment 2>

In order to study the productivity, 10 charges of a steel containing C: 0.0020 mass %, Si: 3.5 mass %, Mn: 0.4 mass %, P: 0.01 mass %, S: 0.001 mass %, Al: 0.7 mass %, N: 0.0016 mass %, and Zn: 0.0011 mass % is melted in a laboratory, casted into a steel ingot and hot rolled to form a hot-rolled sheet with a thickness of 2 mm. Next, the hot-rolled sheet is then subjected to a hot-band annealing at 1000° C. for 30 seconds under an atmosphere of 100 vol % $N_2$, pickling, and cold rolling to form a cold-rolled sheet with a thickness of 0.25 mm. The cold-rolled sheet is then subjected to a finish annealing under an atmosphere of 20 vol % $H_2$-80 vol % $N_2$ at 800° C. for 10 seconds.

The fatigue properties of the finish-annealed steel sheets obtained by the 10 charges are each evaluated. Among them, some finish-annealed sheets show significantly low fatigue limits. To investigate the cause thereof, a surface of each steel sheet is polished by 50 μm, and is observed by a SEM (scanning electron microscope), where coarse inclusions are observed in material having a low fatigue limit. From the result, it is considered that the coarse inclusions act as a starting point for cracks during the fatigue test and lowers the fatigue limit.

To investigate the influence of the inclusions upon the fatigue limit, the size (diameter equivalent to a circle) and the number of the inclusions observed in an observation visual field of 0.1 $mm^2$ on the surface after the polishing and the number generated therein. Here, a diameter equivalent to a circle means a diameter of a circle that has the same area as that of the observed inclusions.

Figure 2:
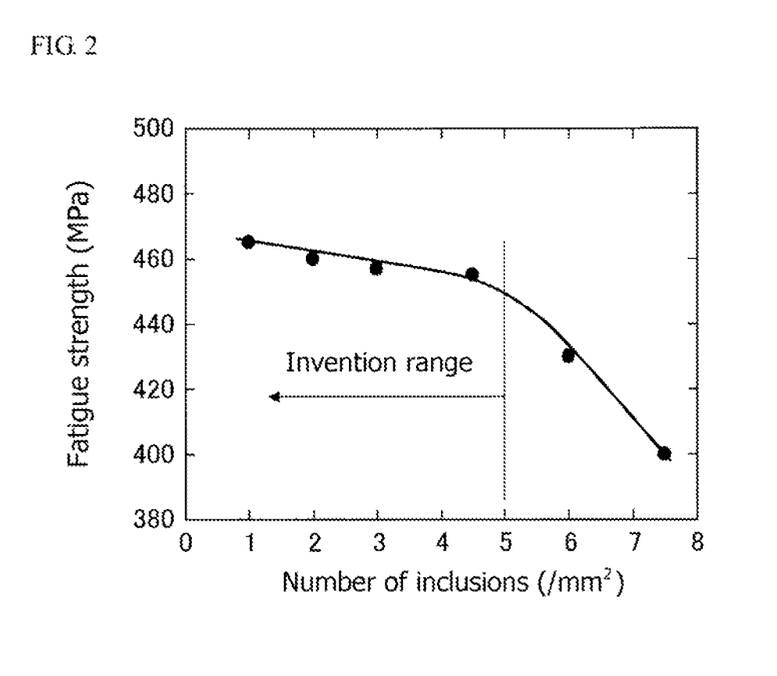
FIG. 2 is a graph showing a relation between the number of inclusions having a diameter of not less than 5 μm equivalent to a circle and a fatigue strength.

FIG. 2 shows the relation between a number of the inclusions having a diameter of not less than 5 μm equivalent to a circle and a fatigue limit. As seen from FIG. 2, the fatigue limit rapidly decreases when the number of the inclusions having a diameter of not less than 5 μm equivalent to a circle exceeds 5/$mm^2$. The influence of inclusions upon the fatigue limit is little in a low-strength electrical steel sheet, while the influence of the coarse inclusions upon the fatigue limit is considered to become apparent in a high-strength electrical steel sheet due to enhanced cracking susceptibility. From the above results, the number of inclusions having a diameter of not less than 5 μm equivalent to a circle is limited to not more than 5/$mm^2$ in accordance with aspects of the present invention. Preferably, it is not more than 3/$mm^2$.

The oxygen (O) content in each steel sheet used in Experiment 2 is measured, and shows a value within the range of 0.0010 to 0.0100 mass % (10 to 100 mass ppm). It is considered that the number of the inclusions is reduced due to decrease in the oxygen amount, while the number of the inclusions having a diameter of not less than 5 μm equivalent to a circle is not necessarily correlated to the oxygen content. From this result, the inventors have found that limiting the oxygen content in steel is not sufficient in order to reduce the number of the inclusions having a diameter of not less than 5 μm equivalent to a circle and decrease the variation of the fatigue strength, and that it is important to conduct a control, which will be described later, of reducing the amount of the inclusions having a diameter equivalent to a circle exceeding 5 μm in the refining process.

<Experiment 3>

Next, an experiment is conduced to investigate the influence of Zn upon variation of tensile strength TS.

Zn is not usually incorporated in steel due to its high vapor pressure, but may be incorporated when scrap is added to molten steel after deoxidization in a refining process for temperature control or the like. Since grains are sufficiently grown in a regular low-strength electrical steel sheet, the strength properties are not affected by mixing Zn to steel. However, in material with fine crystal grains such as a high-strength electrical steel sheet, which is the target of aspects of this invention, Zn is considered to be the cause of the strength variation.

In the above experiment, a steel containing C: 0.0025 mass %, Si: 3.6 mass %, Mn: 0.8 mass %, P: 0.01 mass %, S: 0.001 mass %, Al: 0.6 mass %, N: 0.0015 mass %, O: 0.0015 mass %, and Zn being varied within the range of 0.0003 to 0.0060 mass % is melted in a laboratory, casted into a steel ingot and hot rolled to form a hot-rolled sheet with a thickness of 2 mm. Next, the hot-rolled sheet is then subjected to a hot-band annealing at 1000° C. for 30 seconds under an atmosphere of 100 vol % $N_2$, pickling, and a cold rolling to form a cold-rolled sheet with a thickness of 0.25 mm. The cold-rolled is then subjected to a finish annealing under an atmosphere of 20 vol % $H_2$-80 vol % $N_2$ at 800° C. for 10 seconds.

Figure 3:
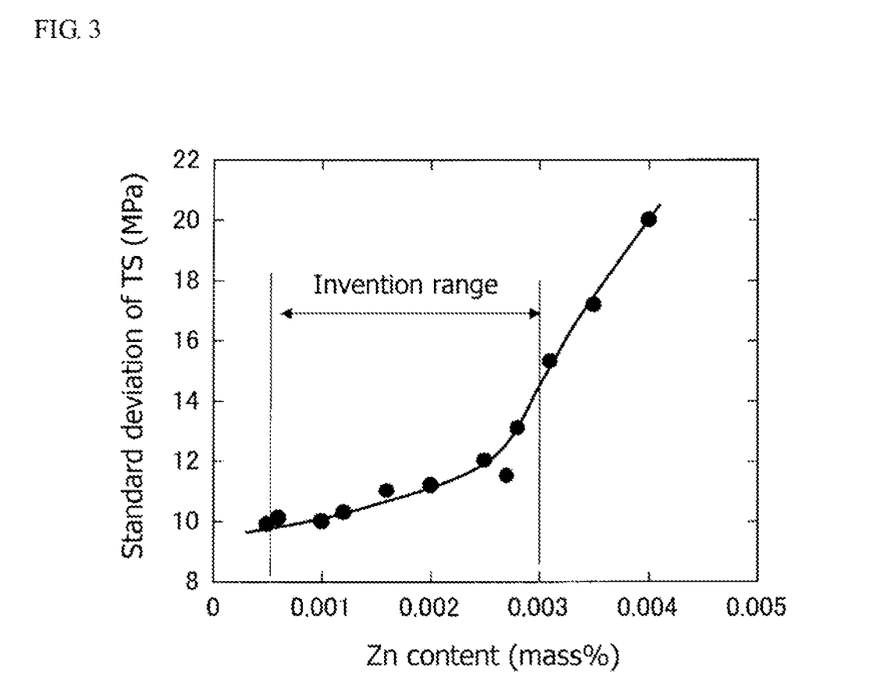
FIG. 3 is a graph showing a relation between a Zn content and a standard deviation σ of a tensile strength TS.

Then, 20 JIS No. 5 test specimens are taken out from each product sheet from the rolling direction as the tensile direction, and tensile tests are conducted in accordance with JIS Z 2241 to measure the tensile strength TS. Thus, the standard deviation σ of the 20 tensile strengths TS is determined. The results are shown in FIG. 3, from which it is found that when the Zn content exceeds 0.003 mass %, the variation of tensile strength TS became larger and the standard deviation σ became not less than 15 MPa.

The cause thereof is considered due to the fact that when Zn is incorporated into the steel, the recrystallization behavior during finish annealing becomes unstable, causing variation in the crystal grain size. Therefore, in accordance with aspects of the present invention, the content of Zn incorporated in as an inevitable impurity is limited to not more than 0.003 mass %.

Aspects of the present invention have been developed based on the above novel knowledge.

The reason of limiting the chemical composition of the non-oriented electrical steel sheet according to aspects of the invention will be hereinafter explained.

C: Not More than 0.005 Mass %

C is a harmful element forming a carbide to be precipitated and having an effect of increasing iron loss. Therefore, C is limited to not more than 0.005 mass %, preferably not more than 0.003 mass %.

Si: 3 to 5 mass %

Si is an element effective for increasing the specific resistance of the steel sheet to thereby reduce iron loss, and hence, it is contained by not less than 3 mass %. When Si content exceeds 5 mass %, on the other hand, the saturated magnetic flux density decreases and the magnetic flux density also decreases therewith. Therefore, the upper limit of Si is 5 mass %. Preferably, the Si content falls within the range of 3.5 to 4.5 mass %.

Mn: Not More than 5 Mass %

Mn is an element effective for increasing the specific resistance of the steel sheet. The Mn content exceeding 5 mass % causes the magnetic flux density to decreases, and accordingly, the upper limit of Mn is 5 mass %. The Mn content is preferably not more than 2 mass %. The lower limit of Mn is not particularly defined, but Mn is preferably contained by not less than 0.1 mass, from the viewpoint of improving the hot workability and iron loss.

P: Not More than 0.1 Mass %

P is an element effective for increasing the strength of steel and improving the blanking ability. However, an addition of P exceeding 0.1 mass % causes embrittlement of steel and also causes the cold rolling to be difficult. Therefore, it is limited to not more than 0.1 mass %. Preferably, P falls within the range of 0.002 to 0.01 mass %.

S: Not More than 0.01 Mass %

S is a harmful element forming MnS with Mn to be precipitated, causing an increase in iron loss. In particular, when the S content exceeds 0.01 mass %, the above harmful effect becomes obvious. Thus, S is limited to not more than 0.01 mass %, preferably not more than 0.005 mass %.

Al: Not More than 3 Mass %

Al is an element effective for decreasing iron loss by increasing specific resistance, like Si. When the content exceeds 3 mass %, however, the saturated magnetic flux density decreases and the magnetic flux density also decreases therewith. Therefore, the Al content is limited to not more than 3 mass %, preferably not more than 2 mass %. The lower limit of Al is not particularly defined; however, it is preferably not less than 0.3 mass %, more preferably 0.5 mass %, from the viewpoint of improving the iron loss.

N: Not More than 0.005 Mass %

N is a harmful element forming a nitride to be precipitated and increasing iron loss. In particular, when the content exceeds 0.005 mass %, the harmful effect becomes obvious. Therefore, N content is limited to 0.005 mass %, preferably 0.002 mass %.

Zn: 0.0005 to 0.003 Mass %

Zn is a harmful element increasing the variation in the tensile strength through changes of the recrystallization behavior as described above, and limited to not more than 0.003 mass %, preferably not more than 0.002 mass % from the viewpoint of decreasing the variation of the tensile strength. Although the Zn content is preferable to be less from the above viewpoint, an addition of a little amount of Zn has an effect of suppressing nitriding to improve the iron loss. Moreover, when the Zn content is excessively reduced, raw materials and scrap to be used need to be carefully selected, which leads to a cost increase. Therefore, the lower limit of the Zn content is approximately 0.0005 mass %.

The non-oriented electrical steel sheet according to aspects of the invention is preferable to the following contain ingredients, in addition to the above ingredients.

Cr: 0.1 to 5 Mass %

Cr is an element effective for increasing the specific resistance to thereby decrease iron loss, like Si, and thus, Cr is preferable to be contained by not less than 0.1 mass %. However, an addition exceeding 5 mass % causes a decrease in saturated magnetic flux density and also an accompanying decrease in magnetic flux density. Therefore, Cr is preferable to be contained by not more than 5 mass %.

Ca: 0.001 to 0.005 Mass %

Ca is an element forming CaS to fix S and contributing to decrease in iron loss. Thus, Ca is preferable to be contained by not less than 0.001 mass %. However, when the addition amount exceeds 0.005 mass %, the above effect is saturated, only causing an increase in production cost. Thus, the upper limit is 0.005 mass %.

Sn: 0.001 to 0.1 Mass %, Sb: 0.001 to 0.1 Mass %

Sn and Sb are elements effective in improving the texture and improving the magnetic flux density. Therefore, it is preferable to contain each element by not less than 0.001 mass %. On the other hand, when the either one exceeds 0.1 mass %, the above effect to be saturated. Therefore, the upper limit is 0.1 mass %.

Ni: 0.1 to 2 Mass %

Ni is an element effective for improving the magnetic flux density. To obtain the effect, it is preferable to add Ni by not less than 0.1 mass %. An addition exceeding 2 mass % only causes the above effect to be saturated and the raw material cost to increase. Therefore, the upper limit is preferably 2 mass %.

Mo: 0.001 to 0.05 Mass %

Mo is an element forming fine carbide to be precipitated and increasing the strength of steel. To obtain the effect, it is preferable to add Mo by not less than 0.001 mass %. When the addition amount exceeds 0.05 mass %, the iron loss remarkably increases. Therefore, the upper limit is preferably 0.05 mass %.

Cu: 0.01 to 0.2 Mass %

Cu is an element improving texture and increasing magnetic flux density. To obtain the effect, it is preferable to add Cr by not less than 0.01 mass %. When it exceeds 0.2 mass %, however, the above effect is saturated to only bring about increase in raw material cost. Therefore, the upper limit of Cu is preferably 0.2 mass %.

Mg: 0.001 to 0.005 Mass %

Mg is an element coarsening inclusions and contributing to decrease in iron loss. To obtain the above effect, it is preferable to add Mg by not less than 0.001 mass %. On the other hand, when the addition amount exceeds 0.005 mass %, the above effect is saturated to only bring about increase in raw material cost. Therefore, the upper limit of Mg is preferably 0.005 mass %.

REM: 0.001 to 0.005 Mass %

REM is an element coarsening sulfide-based inclusions and contributing to decrease in the iron loss. To obtain the above effect, it is preferable to add REM by not less than 0.001 mass %. On the other hand, when the addition amount exceeds 0.005 mass %, the above effect is saturated to only bring about increase in raw material cost. Therefore, the upper limit is preferably 0.005 mass %.

(Ti+V): 0.005 to 0.05 Mass %

Ti and V are elements forming fine nitride to be precipitated and enhancing strength of steel. To obtain the above effect, it is preferable to add either Ti or V alone, or Ti and V together, by not less than 0.005 mass in total. When the addition amount of either Ti or V alone, or of Ti and V in total exceeds 0.05 mass %, the iron loss remarkably increases. Therefore, the upper limit of either Ti or V alone or the total amount of Ti and V is preferably 0.05 mass %.

The residue other than the above elements are Fe and inevitable impurities in the non-oriented electrical steel sheet according to aspects of the invention. As being a harmful element forming oxide-based inclusions and increasing iron loss, O is preferably reduced as much as possible and limited to not more than 0.005 mass %.

There will be described a method for producing a non-oriented electrical steel sheet according to aspects of the invention below.

A method for producing a non-oriented electrical steel sheet according to aspects of the invention can be carried out based on a normal method, as long as the steel sheet has a chemical composition according to aspects of the invention. That is, a non-oriented electrical steel sheet according to aspects of the invention can be produced by subjecting a molten steel after blowing in a converter to secondary refining by a vacuum degassing treatment or the like to adjust the chemical composition to the determined one, forming a steel material (slab) by a continuous casting method or ingot-making and blooming method, subjecting the steel material to hot rolling, and then to hot-band annealing as required, and cold rolling the sheet to form a cold-rolled sheet with a final thickness followed by finish annealing.

In order to reduce the number of the inclusions having a diameter of not less than 5 µm equivalent to a circle in the steel sheet to not more than 5 per 1 mm², it is preferable that the recirculation time after an addition of deoxidizer in a vacuum degassing treatment of the secondary refining is not less than 10 minutes. It is also preferable that the recirculation time after charging of scrap or ferro-alloy is not less than 5 minutes to evaporate and remove Zn which has been mixed from the scrap or ferro-alloy. The apparatus used for the vacuum degassing treatment can be based on either the RH method or DH method.

The finish rolling end temperature (FDT) and the coiling temperature (CT) in the hot rolling may be based on usual methods, and not particularly limited. The hot-band annealing after the hot rolling can be performed, but is not necessarily required. Also, the cold rolling may be performed once, or twice or more with an intermediate annealing between cold rollings, and not particularly limited. The finish annealing subsequent to the cold rolling is preferable to be carried out at a soaking temperature of not higher than 850° C. for a soaking time of 5 to 120 seconds to make the crystal grains finer.

The steel sheet after the finish annealing is formed into a product sheet by applying an insulating coating as necessary. The insulating film is preferable to be selected from inorganic, organic, and mixed inorganic/organic coatings properly according to the purpose.

Example

A molten steel after blowing in a converter is subjected to a vacuum degassing treatment to produce a steel having a composition of No. 1 to 62 shown in Table 1. Each steel is subjected to continuous casting and formed into a steel material (slab). In this process, the recirculation time after deoxidization in the vacuum degassing treatment is varied as shown in Table 2. Then, the slab is reheated to a temperature of 1140° C., held for 1 hour, hot rolled with a finishing rolling end temperature of 800° C. to form a hot-rolled sheet, and then coiled at a temperature of 610° C. Thereafter, the hot-rolled sheet is subjected to a hot-band annealing at 950° C. for 30 seconds under an atmosphere of 100 vol % $N_2$ atmosphere, pickling, cold rolling to form a cold-rolled sheet with a thickness of 0.25 mm, and finish annealing in an atmosphere of 20 vol % $H_2$ and 80 vol % $N_2$ under the conditions shown in Table 2 to form a product sheet.

From the obtained product sheet, Epstein test specimens are taken out in the rolling direction and a direction perpendicular to the rolling direction to measure a magnetic flux density $B_{50}$ and high frequency iron loss $W_{5/3k}$ by the Epstein method.

A sample for texture observation is taken out from the product sheet, and the cross section in the rolling direction is polished and etched with Nital to measure the crystal grain size in accordance with JIS G0551, whereby an average crystal grain is determined. Also, the number of the inclusions having a diameter of not less than 5 µm equivalent to a circle per 1 mm² is determined by polishing the steel sheet surface by 50 µm and observing 10 fields within a 0.1 mm² area by SEM.

From the above product sheet, 20 JIS No. 5 test specimens is taken out with the tensile direction in the rolling direction, each subjected to a tensile test in accordance with JIS Z 2241 to measure tensile strength TS, whereby the average value and standard deviation σ of the 20 tensile tests are obtained.

Moreover, a test specimen for a fatigue test having a parallel body with a width of 5 mm and a length of 150 mm is taken out from the above product sheet from the rolling direction as the length direction, subjected to a fatigue test under conditions of pulsating tension loading, a stress ratio of 0.1, and a frequency of 20 Hz to measure a stress amplitude (fatigue limit) at which no breakage is caused after repetitions of $10^7$ times. In this test, the test specimen for a fatigue test is finished so that the parallel body is finished to have surface roughness of ∇ ∇ ∇, and further polished with an emery paper No. 800 along with the longitudinal direction.

The results of the above measurements are also shown in Table 2. As seen from the results, the non-oriented electrical steel sheet produced using a steel material having a chemical composition conforming to aspects of the present invention not only has excellent magnetic properties, but also excellent tensile strength and fatigue strength.

TABLE 1-1

| | Chemical Composition (mass %) | | | | | | | | | | | | | |
|---|---|---|---|---|---|---|---|---|---|---|---|---|---|---|
| No | C | Si | Mn | P | S | Al | N | Zn | Cr | Ca | Sb | Sn | Ni, Mo, Ti, V, REM, Mg | Remarks |
| 1  | 0.0020 | 3.60 | 0.50 | 0.010 | 0.0015 | 1.00 | 0.0018 | 0.0020 | 0.010 | — | — | 0.030 | — | Invention steel |
| 2  | 0.0020 | 3.61 | 0.52 | 0.010 | 0.0015 | 1.00 | 0.0017 | 0.0020 | 0.010 | — | — | 0.032 | — | Invention steel |
| 3  | 0.0022 | 3.60 | 0.50 | 0.010 | 0.0018 | 1.00 | 0.0018 | 0.0020 | 0.010 | — | — | 0.030 | — | Invention steel |
| 4  | 0.0019 | 3.60 | 0.48 | 0.010 | 0.0013 | 1.00 | 0.0018 | 0.0020 | 0.010 | — | — | 0.031 | — | Invention steel |
| 5  | 0.0020 | 3.62 | 0.49 | 0.010 | 0.0015 | 1.00 | 0.0018 | 0.0020 | 0.010 | — | — | 0.031 | — | Invention steel |
| 6  | 0.0016 | 3.65 | 0.50 | 0.016 | 0.0012 | 1.10 | 0.0019 | 0.0005 | 0.010 | — | — | 0.033 | — | Invention steel |
| 7  | 0.0017 | 3.61 | 0.51 | 0.008 | 0.0012 | 1.10 | 0.0018 | 0.0010 | 0.010 | — | — | 0.029 | — | Invention steel |
| 8  | 0.0018 | 3.64 | 0.50 | 0.007 | 0.0018 | 1.10 | 0.0017 | 0.0025 | 0.010 | — | — | 0.031 | — | Invention steel |
| 9  | 0.0015 | 3.40 | 0.50 | 0.010 | 0.0016 | 1.10 | 0.0021 | 0.0038 | 0.010 | — | — | 0.030 | — | Comparative steel |
| 10 | 0.0021 | 2.40 | 0.52 | 0.010 | 0.0009 | 1.10 | 0.0017 | 0.0010 | 0.010 | — | — | 0.035 | — | Comparative steel |
| 11 | 0.0020 | 3.20 | 1.00 | 0.005 | 0.0008 | 1.20 | 0.0014 | 0.0010 | 0.100 | — | — | 0.034 | — | Invention steel |
| 12 | 0.0020 | 3.70 | 0.53 | 0.005 | 0.0008 | 0.70 | 0.0014 | 0.0010 | 0.100 | — | — | 0.034 | — | Invention steel |
| 13 | 0.0021 | 4.00 | 0.56 | 0.004 | 0.0009 | 1.10 | 0.0013 | 0.0010 | 0.100 | — | — | 0.040 | — | Invention steel |
| 14 | 0.0022 | 4.50 | 0.50 | 0.010 | 0.0007 | 1.10 | 0.0022 | 0.0010 | 0.100 | — | — | 0.035 | — | Invention steel |
| 15 | 0.0019 | 5.50 | 0.50 | 0.010 | 0.0012 | 1.10 | 0.0026 | 0.0010 | 0.010 | — | — | 0.035 | — | Comparative steel |
| 16 | 0.0020 | 3.81 | 0.65 | 0.010 | 0.0008 | 0.68 | 0.0014 | 0.0010 | 0.100 | — | — | 0.035 | — | Invention steel |
| 17 | 0.0045 | 3.82 | 0.65 | 0.005 | 0.0008 | 0.70 | 0.0022 | 0.0010 | 0.100 | — | — | 0.035 | — | Invention steel |
| 18 | 0.0062 | 3.80 | 0.65 | 0.004 | 0.0008 | 0.70 | 0.0014 | 0.0010 | 0.100 | — | — | 0.035 | — | Comparative steel |
| 19 | 0.0020 | 3.80 | 0.20 | 0.010 | 0.0008 | 0.71 | 0.0014 | 0.0010 | 0.110 | — | — | 0.035 | — | Invention steel |
| 20 | 0.0020 | 3.80 | 1.60 | 0.010 | 0.0008 | 0.70 | 0.0014 | 0.0010 | 0.120 | — | — | 0.035 | — | Invention steel |
| 21 | 0.0020 | 3.32 | 2.50 | 0.008 | 0.0008 | 0.50 | 0.0016 | 0.0010 | 0.120 | — | — | 0.035 | — | Invention steel |
| 22 | 0.0020 | 3.20 | 5.50 | 0.010 | 0.0008 | 0.40 | 0.0014 | 0.0010 | 0.130 | — | — | 0.035 | — | Comparative steel |
| 23 | 0.0020 | 3.80 | 1.10 | 0.010 | 0.0008 | 0.31 | 0.0015 | 0.0010 | 0.100 | — | — | 0.035 | — | Invention steel |
| 24 | 0.0020 | 3.60 | 1.20 | 0.009 | 0.0008 | 0.55 | 0.0020 | 0.0010 | 0.100 | — | — | 0.035 | — | Invention steel |
| 25 | 0.0020 | 3.30 | 0.65 | 0.010 | 0.0008 | 1.50 | 0.0014 | 0.0010 | 0.120 | — | — | 0.035 | — | Invention steel |
| 26 | 0.0020 | 3.20 | 0.65 | 0.010 | 0.0008 | 3.50 | 0.0014 | 0.0010 | 0.110 | — | — | 0.035 | — | Comparative steel |
| 27 | 0.0015 | 3.50 | 0.80 | 0.010 | 0.0008 | 1.20 | 0.0014 | 0.0010 | 0.100 | — | — | 0.035 | — | Invention steel |
| 28 | 0.0020 | 3.80 | 0.65 | 0.150 | 0.0008 | 0.70 | 0.0014 | 0.0010 | 0.130 | — | — | 0.035 | — | Comparative steel |
| 29 | 0.0016 | 3.80 | 0.65 | 0.010 | 0.0050 | 0.70 | 0.0021 | 0.0010 | 0.100 | — | — | 0.035 | — | Invention steel |
| 30 | 0.0017 | 3.80 | 0.65 | 0.010 | 0.0050 | 0.70 | 0.0019 | 0.0036 | 0.100 | — | — | 0.035 | — | Comparative steel |
| 31 | 0.0022 | 3.72 | 0.65 | 0.010 | 0.0150 | 0.71 | 0.0014 | 0.0010 | 0.100 | — | — | 0.035 | — | Comparative steel |

TABLE 1-2

| | Chemical composition (mass %) | | | | | | | | | | | | | |
|---|---|---|---|---|---|---|---|---|---|---|---|---|---|---|
| No | C | Si | Mn | P | S | Al | N | Zn | Cr | Ca | Sb | Sn | Ni, Mo, Ti, V, REM, Mg | Remarks |
| 32 | 0.0026 | 3.75 | 0.65 | 0.010 | 0.0008 | 0.69 | 0.0060 | 0.0010 | 0.100 | — | — | 0.035 | — | Comparative steel |
| 33 | 0.0031 | 3.77 | 0.65 | 0.011 | 0.0008 | 0.72 | 0.0012 | 0.0010 | 0.100 | — | — | — | — | Invention steel |
| 34 | 0.0032 | 3.70 | 0.80 | 0.013 | 0.0010 | 0.73 | 0.0015 | 0.0010 | 0.100 | — | 0.0020 | — | — | Invention steel |
| 35 | 0.0029 | 3.65 | 0.80 | 0.009 | 0.0011 | 0.74 | 0.0016 | 0.0010 | 0.100 | — | 0.0500 | — | — | Invention steel |
| 36 | 0.0010 | 3.72 | 0.81 | 0.008 | 0.0013 | 0.73 | 0.0021 | 0.0010 | 0.100 | — | — | 0.002 | — | Invention steel |
| 37 | 0.0011 | 3.81 | 0.82 | 0.007 | 0.0011 | 0.68 | 0.0022 | 0.0010 | 0.100 | — | — | 0.050 | — | Invention steel |
| 38 | 0.0026 | 3.82 | 0.83 | 0.011 | 0.0014 | 0.72 | 0.0026 | 0.0010 | 0.100 | — | 0.0020 | 0.030 | — | Invention steel |
| 39 | 0.0020 | 3.75 | 0.81 | 0.009 | 0.0016 | 0.70 | 0.0027 | 0.0010 | 2.500 | — | — | 0.035 | — | Invention steel |
| 40 | 0.0017 | 3.76 | 0.83 | 0.008 | 0.0015 | 0.70 | 0.0020 | 0.0010 | 0.100 | 0.0020 | — | 0.035 | — | Invention steel |
| 41 | 0.0014 | 3.80 | 0.81 | 0.010 | 0.0016 | 0.70 | 0.0018 | 0.0010 | 0.100 | 0.0045 | — | 0.035 | — | Invention steel |
| 42 | 0.0016 | 3.80 | 0.65 | 0.010 | 0.0008 | 0.70 | 0.0013 | 0.0010 | 0.100 | — | — | 0.035 | — | Invention steel |
| 43 | 0.0025 | 3.80 | 0.65 | 0.005 | 0.0008 | 0.70 | 0.0020 | 0.0010 | 0.100 | — | — | 0.035 | Ni: 0.20 | Invention steel |
| 44 | 0.0023 | 3.81 | 0.65 | 0.005 | 0.0008 | 0.70 | 0.0018 | 0.0010 | 0.100 | — | — | 0.035 | Ni: 0.50 | Invention steel |
| 45 | 0.0026 | 3.79 | 0.65 | 0.005 | 0.0010 | 0.70 | 0.0019 | 0.0010 | 0.100 | — | — | 0.035 | Ni: 1.50 | Invention steel |
| 46 | 0.0027 | 3.85 | 0.65 | 0.005 | 0.0011 | 0.70 | 0.0022 | 0.0010 | 0.100 | — | — | 0.035 | Mo: 0.002 | Invention steel |
| 47 | 0.0026 | 3.84 | 0.65 | 0.005 | 0.0012 | 0.70 | 0.0022 | 0.0010 | 0.100 | — | — | 0.035 | Mo: 0.010 | Invention steel |
| 48 | 0.0021 | 3.83 | 0.65 | 0.005 | 0.0008 | 0.70 | 0.0020 | 0.0010 | 0.100 | — | — | 0.035 | Mo: 0.040 | Invention steel |
| 49 | 0.0021 | 3.79 | 0.63 | 0.005 | 0.0010 | 0.70 | 0.0017 | 0.0010 | 0.100 | — | — | 0.035 | Cu: 0.02 | Invention steel |
| 50 | 0.0022 | 3.81 | 0.64 | 0.005 | 0.0010 | 0.70 | 0.0016 | 0.0010 | 0.100 | — | — | 0.035 | Cu: 0.18 | Invention steel |
| 51 | 0.0029 | 3.79 | 0.65 | 0.005 | 0.0008 | 0.70 | 0.0015 | 0.0010 | 0.100 | — | — | 0.035 | Ti: 0.006 | Invention steel |
| 52 | 0.0027 | 3.81 | 0.65 | 0.005 | 0.0008 | 0.70 | 0.0023 | 0.0010 | 0.100 | — | — | 0.035 | Ti: 0.020 | Invention steel |
| 53 | 0.0025 | 3.82 | 0.65 | 0.005 | 0.0010 | 0.70 | 0.0024 | 0.0010 | 0.100 | — | — | 0.035 | Ti: 0.045 | Invention steel |
| 54 | 0.0028 | 3.82 | 0.65 | 0.005 | 0.0007 | 0.71 | 0.0017 | 0.0010 | 0.100 | — | — | 0.035 | V: 0.007 | Invention steel |
| 55 | 0.0029 | 3.83 | 0.64 | 0.005 | 0.0012 | 0.72 | 0.0016 | 0.0010 | 0.100 | — | — | 0.035 | V: 0.015 | Invention steel |
| 56 | 0.0032 | 3.79 | 0.66 | 0.005 | 0.0008 | 0.69 | 0.0015 | 0.0010 | 0.100 | — | — | 0.035 | V: 0.039 | Invention steel |
| 57 | 0.0034 | 3.79 | 0.64 | 0.005 | 0.0008 | 0.75 | 0.0018 | 0.0010 | 0.100 | — | — | 0.035 | REM: 0.0013 | Invention steel |
| 58 | 0.0031 | 3.79 | 0.66 | 0.005 | 0.0008 | 0.75 | 0.0019 | 0.0010 | 0.100 | — | — | 0.035 | REM: 0.0042 | Invention steel |
| 59 | 0.0031 | 3.87 | 0.64 | 0.005 | 0.0008 | 0.69 | 0.0022 | 0.0010 | 0.100 | — | — | 0.035 | Mg: 0.0015 | Invention steel |
| 60 | 0.0031 | 3.87 | 0.64 | 0.005 | 0.0008 | 0.69 | 0.0022 | 0.0010 | 0.100 | — | — | 0.035 | Mg: 0.0045 | Invention steel |
| 61 | 0.0029 | 3.81 | 0.65 | 0.005 | 0.0007 | 0.70 | 0.0020 | 0.0010 | 0.100 | — | — | 0.036 | Ti: 0.006, V: 0.008 | Invention steel |
| 62 | 0.0026 | 3.83 | 0.65 | 0.005 | 0.0007 | 0.70 | 0.0021 | 0.0010 | 0.100 | — | — | 0.036 | Ti: 0.010, V: 0.012 | Invention steel |

TABLE 2-1

| | Production condition | | | Product properties | | | | | | | |
|---|---|---|---|---|---|---|---|---|---|---|---|
| No | RH recirculation time (min) | Product sheet thickness (mm) | Finish annealing temperature (° C.) | Crystal grain size (μm) | Number of inclusions of not less than 5 μm (/mm$^2$) | Iron loss $W_{5/3k}$ (W/kg) | Magnetic flux density $B_{50}$ (T) | Tensile strength TS (MPa) | standard deviation σ of TS (MPa) | Fatigue limit (MPa) | Remarks |
| 1 | 20 | 0.25 | 800 | 30 | 2 | 75.0 | 1.66 | 640 | 12 | 460 | Invention Example |
| 2 | 15 | 0.25 | 800 | 29 | 4 | 75.5 | 1.66 | 640 | 12 | 460 | Invention Example |
| 3 | 5 | 0.25 | 800 | 28 | 7 | 76.0 | 1.66 | 630 | 12 | 440 | Comparative Example |
| 4 | 20 | 0.25 | 850 | 39 | 2 | 68.0 | 1.66 | 610 | 13 | 455 | Invention Example |
| 5 | 20 | 0.25 | 900 | 50 | 2 | 63.0 | 1.67 | 580 | 13 | 430 | Comparative Example |
| 6 | 15 | 0.25 | 800 | 22 | 4 | 75.0 | 1.66 | 640 | 10 | 460 | Invention Example |
| 7 | 15 | 0.25 | 800 | 20 | 4 | 75.2 | 1.66 | 640 | 12 | 460 | Invention Example |
| 8 | 15 | 0.25 | 800 | 19 | 4 | 75.6 | 1.66 | 640 | 14 | 455 | Invention Example |
| 9 | 15 | 0.25 | 800 | 18 | 4 | 75.3 | 1.66 | 640 | 19 | 455 | Comparative Example |
| 10 | 20 | 0.25 | 800 | 35 | 2 | 82.4 | 1.71 | 535 | 11 | 385 | Comparative Example |
| 11 | 20 | 0.25 | 800 | 30 | 2 | 73.4 | 1.66 | 627 | 12 | 451 | Invention Example |
| 12 | 20 | 0.25 | 800 | 30 | 2 | 75.1 | 1.66 | 649 | 12 | 467 | Invention Example |
| 13 | 20 | 0.25 | 800 | 30 | 2 | 71.0 | 1.64 | 697 | 11 | 502 | Invention Example |
| 14 | 20 | 0.25 | 800 | 28 | 2 | 68.7 | 1.62 | 746 | 12 | 537 | Invention Example |
| 15 | 20 | 0.25 | 800 | 25 | 2 | 64.7 | 1.55 | 844 | 13 | 608 | Comparative Example |
| 16 | 17 | 0.25 | 820 | 32 | 3 | 74.0 | 1.65 | 661 | 11 | 476 | Invention Example |
| 17 | 17 | 0.25 | 820 | 32 | 3 | 73.8 | 1.65 | 663 | 11 | 477 | Invention Example |
| 18 | 17 | 0.25 | 820 | 32 | 4 | 77.0 | 1.65 | 670 | 11 | 482 | Comparative Example |
| 19 | 17 | 0.25 | 820 | 32 | 3 | 75.6 | 1.65 | 656 | 12 | 472 | Invention Example |
| 20 | 17 | 0.25 | 820 | 30 | 3 | 70.6 | 1.63 | 673 | 11 | 485 | Invention Example |
| 21 | 17 | 0.25 | 820 | 22 | 3 | 71.1 | 1.62 | 629 | 13 | 453 | Invention Example |
| 22 | 17 | 0.25 | 820 | 18 | 3 | 72.0 | 1.53 | 651 | 11 | 469 | Comparative Example |
| 23 | 17 | 0.25 | 820 | 30 | 3 | 74.5 | 1.65 | 650 | 10 | 468 | Invention Example |
| 24 | 17 | 0.25 | 820 | 31 | 3 | 74.0 | 1.65 | 641 | 12 | 462 | Invention Example |
| 25 | 17 | 0.25 | 820 | 29 | 3 | 72.4 | 1.63 | 646 | 12 | 465 | Invention Example |
| 26 | 17 | 0.25 | 820 | 27 | 3 | 64.3 | 1.55 | 721 | 11 | 520 | Comparative |
| 27 | 17 | 0.25 | 820 | 32 | 3 | 72.4 | 1.65 | 654 | 11 | 470 | Invention Example |
| 28 | 17 | — | — | — | — | — | — | — | — | — | Comparative Example |
| 29 | 20 | 0.25 | 800 | 30 | 2 | 74.5 | 1.65 | 661 | 11 | 475 | Invention Example |
| 30 | 20 | 0.25 | 800 | 30 | 2 | 74.5 | 1.65 | 660 | 18 | 460 | Comparative Example |
| 31 | 22 | 0.25 | 780 | 26 | 5 | 78.0 | 1.65 | 675 | 12 | 485 | Comparative Example |

* Fracture is caused in steel material No. 28 in cold rolling, so that the product sheet cannot be provided.

TABLE 2-2

| | Production condition | | | Product properties | | | | | | | |
|---|---|---|---|---|---|---|---|---|---|---|---|
| No | RH recirculation time (min) | Product sheet thickness (mm) | Finish annealing temperature (° C.) | Crystal grain size (μm) | Number of inclusions of not less than 5 μm (/mm$^2$) | Iron loss $W_{5/3k}$ (W/kg) | Magnetic flux density $B_{50}$ (T) | Tensile strength TS (MPa) | standard deviation σ of TS (MPa) | Fatigue limit (MPa) | Remarks |
| 32 | 22 | 0.25 | 780 | 32 | 3 | 77.2 | 1.65 | 665 | 11 | 479 | Comparative Example |
| 33 | 22 | 0.25 | 780 | 32 | 1 | 74.0 | 1.62 | 659 | 10 | 474 | Invention Example |
| 34 | 22 | 0.25 | 780 | 33 | 1 | 74.2 | 1.63 | 654 | 13 | 471 | Invention Example |
| 35 | 22 | 0.25 | 780 | 29 | 1 | 73.6 | 1.65 | 670 | 11 | 482 | Invention Example |
| 36 | 22 | 0.25 | 780 | 34 | 1 | 74.1 | 1.62 | 656 | 11 | 470 | Invention Example |
| 37 | 22 | 0.25 | 780 | 28 | 1 | 73.7 | 1.65 | 672 | 12 | 480 | Invention Example |
| 38 | 22 | 0.25 | 780 | 32 | 1 | 71.6 | 1.63 | 674 | 11 | 485 | Invention Example |
| 39 | 22 | 0.25 | 780 | 32 | 1 | 66.2 | 1.61 | 703 | 11 | 499 | Invention Example |
| 40 | 22 | 0.25 | 780 | 34 | 1 | 73.4 | 1.66 | 659 | 11 | 470 | Invention Example |
| 41 | 22 | 0.25 | 780 | 36 | 1 | 73.2 | 1.66 | 658 | 12 | 474 | Invention Example |
| 42 | 22 | 0.20 | 790 | 32 | 1 | 59.0 | 1.64 | 661 | 12 | 476 | Invention Example |
| 43 | 17 | 0.25 | 820 | 32 | 3 | 73.6 | 1.66 | 661 | 11 | 476 | Invention Example |
| 44 | 17 | 0.25 | 820 | 32 | 3 | 73.2 | 1.67 | 665 | 11 | 479 | Invention Example |
| 45 | 17 | 0.25 | 820 | 32 | 3 | 72.2 | 1.68 | 670 | 11 | 482 | Invention Example |
| 46 | 17 | 0.25 | 820 | 32 | 3 | 73.7 | 1.65 | 670 | 11 | 482 | Invention Example |
| 47 | 17 | 0.25 | 820 | 32 | 3 | 73.7 | 1.65 | 675 | 11 | 486 | Invention Example |
| 48 | 17 | 0.25 | 820 | 32 | 3 | 74.1 | 1.64 | 685 | 11 | 493 | Invention Example |
| 49 | 17 | 0.25 | 820 | 31 | 3 | 73.7 | 1.67 | 660 | 11 | 475 | Invention Example |
| 50 | 17 | 0.25 | 820 | 31 | 3 | 73.8 | 1.67 | 662 | 11 | 477 | Invention Example |
| 51 | 17 | 0.25 | 820 | 32 | 3 | 74.2 | 1.65 | 672 | 11 | 484 | Invention Example |
| 52 | 17 | 0.25 | 820 | 32 | 3 | 75.2 | 1.64 | 679 | 11 | 489 | Invention Example |
| 53 | 17 | 0.25 | 820 | 32 | 3 | 76.2 | 1.63 | 685 | 11 | 493 | Invention Example |
| 54 | 17 | 0.25 | 820 | 32 | 3 | 74.0 | 1.65 | 675 | 11 | 486 | Invention Example |
| 55 | 17 | 0.25 | 820 | 32 | 3 | 74.6 | 1.65 | 675 | 11 | 486 | Invention Example |
| 56 | 17 | 0.25 | 820 | 32 | 3 | 75.6 | 1.63 | 680 | 11 | 490 | Invention Example |
| 57 | 17 | 0.25 | 820 | 32 | 3 | 73.2 | 1.65 | 662 | 11 | 476 | Invention Example |
| 58 | 17 | 0.25 | 820 | 32 | 3 | 73.4 | 1.65 | 663 | 11 | 477 | Invention Example |
| 59 | 17 | 0.25 | 820 | 32 | 3 | 73.1 | 1.65 | 667 | 11 | 480 | Invention Example |

TABLE 2-2-continued

| | Production condition | | | Product properties | | | | | | | |
|---|---|---|---|---|---|---|---|---|---|---|---|
| No | RH recirculation time (min) | Product sheet thickness (mm) | Finish annealing temperature (° C.) | Crystal grain size (μm) | Number of inclusions of not less than 5 μm (/mm²) | Iron loss $W_{5/3k}$ (W/kg) | Magnetic flux density $B_{50}$ (T) | Tensile strength TS (MPa) | standard deviation σ of TS (MPa) | Fatigue limit (MPa) | Remarks |
| 60 | 17 | 0.25 | 820 | 32 | 3 | 73.2 | 1.65 | 668 | 11 | 481 | Invention Example |
| 61 | 17 | 0.25 | 820 | 32 | 3 | 74.3 | 1.65 | 676 | 11 | 487 | Invention Example |
| 62 | 17 | 0.25 | 820 | 32 | 3 | 74.8 | 1.65 | 681 | 11 | 490 | Invention Example |

INDUSTRIAL APPLICABILITY

The method according to aspects of the present invention can be applied not only to HEV/EV motors and high-efficiency air conditioner motors, but also to materials for rotors of high-speed motors such as spindle motors of machine tools and railroad motors.

The invention claimed is:

1. A non-oriented electrical steel sheet characterized by having
    a chemical composition comprising C: not more than 0.005 mass %, Si: 3 to 5 mass %, Mn: not more than 5 mass %, P: not more than 0.1 mass %, S: not more than 0.01 mass %, Al: not more than 3 mass %, N: not more than 0.005 mass %, Zn: 0.0005 to 0.003 mass %, and the remainder being Fe and inevitable impurities,
    an average crystal grain size being not more than 40 μm,
    a number of inclusions having a diameter of not less than 5 μm being not more than 5/mm²,
    a tensile strength being not less than 600 MPa, and
    a fatigue strength being not less than 450 MPa.

2. The non-oriented electrical steel sheet according to claim 1,
    which further contains Cr by 0.1 to 5 mass % in addition to the above chemical composition.

3. The non-oriented electrical steel sheet according to claim 1,
    which further contains Ca by 0.001 to 0.005 mass % in addition to the above chemical composition.

4. The non-oriented electrical steel sheet according to claim 1,
    which further contains one or two selected from Sn: 0.001 to 0.1 mass % and Sb: 0.001 to 0.1 mass % in addition to the above chemical composition.

5. The non-oriented electrical steel sheet according to claim 1,
    which further contains at least one selected from Ni: 0.1 to 2 mass %, Mo: 0.001 to 0.05 mass %, Cu: 0.01 to 0.2 mass %, Mg: 0.001 to 0.005 mass %, REM: 0.001 to 0.005 mass %, and (Ti+V): 0.005 to 0.05 mass %.

6. The non-oriented electrical steel sheet according to claim 2,
    which further contains Ca by 0.001 to 0.005 mass % in addition to the above chemical composition.

7. The non-oriented electrical steel sheet according to claim 2,
    which further contains one or two selected from Sn: 0.001 to 0.1 mass % and Sb: 0.001 to 0.1 mass % in addition to the above chemical composition.

8. The non-oriented electrical steel sheet according to claim 3,
    which further contains one or two selected from Sn: 0.001 to 0.1 mass % and Sb: 0.001 to 0.1 mass % in addition to the above chemical composition.

9. The non-oriented electrical steel sheet according to claim 6,
    which further contains one or two selected from Sn: 0.001 to 0.1 mass % and Sb: 0.001 to 0.1 mass % in addition to the above chemical composition.

10. The non-oriented electrical steel sheet according to claim 2,
    which further contains at least one selected from Ni: 0.1 to 2 mass %, Mo: 0.001 to 0.05 mass %, Cu: 0.01 to 0.2 mass %, Mg: 0.001 to 0.005 mass %, REM: 0.001 to 0.005 mass %, and (Ti+V): 0.005 to 0.05 mass %.

11. The non-oriented electrical steel sheet according to claim 3,
    which further contains at least one selected from Ni: 0.1 to 2 mass %, Mo: 0.001 to 0.05 mass %, Cu: 0.01 to 0.2 mass %, Mg: 0.001 to 0.005 mass %, REM: 0.001 to 0.005 mass %, and (Ti+V): 0.005 to 0.05 mass %.

12. The non-oriented electrical steel sheet according to claim 4,
    which further contains at least one selected from Ni: 0.1 to 2 mass %, Mo: 0.001 to 0.05 mass %, Cu: 0.01 to 0.2 mass %, Mg: 0.001 to 0.005 mass %, REM: 0.001 to 0.005 mass %, and (Ti+V): 0.005 to 0.05 mass %.

13. The non-oriented electrical steel sheet according to claim 6,
    which further contains at least one selected from Ni: 0.1 to 2 mass %, Mo: 0.001 to 0.05 mass %, Cu: 0.01 to 0.2 mass %, Mg: 0.001 to 0.005 mass %, REM: 0.001 to 0.005 mass %, and (Ti+V): 0.005 to 0.05 mass %.

14. The non-oriented electrical steel sheet according to claim 7,
    which further contains at least one selected from Ni: 0.1 to 2 mass %, Mo: 0.001 to 0.05 mass %, Cu: 0.01 to 0.2 mass %, Mg: 0.001 to 0.005 mass %, REM: 0.001 to 0.005 mass %, and (Ti+V): 0.005 to 0.05 mass %.

15. The non-oriented electrical steel sheet according to claim 8,
    which further contains at least one selected from Ni: 0.1 to 2 mass %, Mo: 0.001 to 0.05 mass %, Cu: 0.01 to 0.2 mass %, Mg: 0.001 to 0.005 mass %, REM: 0.001 to 0.005 mass %, and (Ti+V): 0.005 to 0.05 mass %.

16. The non-oriented electrical steel sheet according to claim 9,
    which further contains at least one selected from Ni: 0.1 to 2 mass %, Mo: 0.001 to 0.05 mass %, Cu: 0.01 to 0.2 mass %, Mg: 0.001 to 0.005 mass %, REM: 0.001 to 0.005 mass %, and (Ti+V): 0.005 to 0.05 mass %.

* * * * *